United States Patent
O'Brien

(10) Patent No.: US 6,556,424 B2
(45) Date of Patent: Apr. 29, 2003

(54) SUPERCAPACITOR WITH MAGNETIZED PARTS

(76) Inventor: Robert N O'Brien, 2614 Queenswood Dr., Victoria BC. (CA), V8N 1X5

( * ) Notice: Subject to any disclaimer, the term of this patent is extended or adjusted under 35 U.S.C. 154(b) by 0 days.

(21) Appl. No.: 10/061,220

(22) Filed: Feb. 4, 2002

(65) Prior Publication Data

US 2002/0118505 A1 Aug. 29, 2002

Related U.S. Application Data

(60) Provisional application No. 60/266,450, filed on Feb. 6, 2001, now abandoned.

(51) Int. Cl.[7] ................................................. H01G 9/00
(52) U.S. Cl. ....................................... 361/502; 361/517
(58) Field of Search ................................ 361/502, 503, 361/517, 518, 519

(56) References Cited

U.S. PATENT DOCUMENTS

| 4,000,004 A | * | 12/1976 | Takahashi et al. ............ 429/10 |
| 5,041,157 A | * | 8/1991 | Seiler et al. .................. 47/57.6 |

* cited by examiner

Primary Examiner—Anthony Dinkins

(57) ABSTRACT

Supercapacitor modification of utility in electric vehicle powering, and directed to optimizing specific capacitance and rate capability by promoting ionic motions in electrolyte during charging and discharging, by means of a high coercivity faces-poled sheet or plate magnet comprising a magnetized metal backing part adjacent the back of a composite porous supercapacitor electrode, ie., at the side away from the region of bulk electrolyte access to pores. A portion of casing of this magnetically enhanced supercapacitor may integrate the plate magnet or the latter may be a separate component applied or fitted to the casing, removably, if desired, to facilitate possible re-magnetization. Except for the magnetized metal backing part and addition of a paramagnetic substance to the electrolyte, all the essential components are known in supercapacitors.

6 Claims, 2 Drawing Sheets

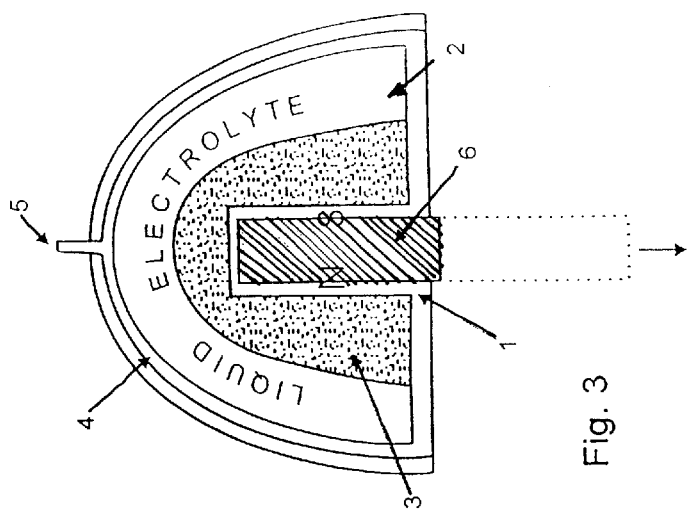
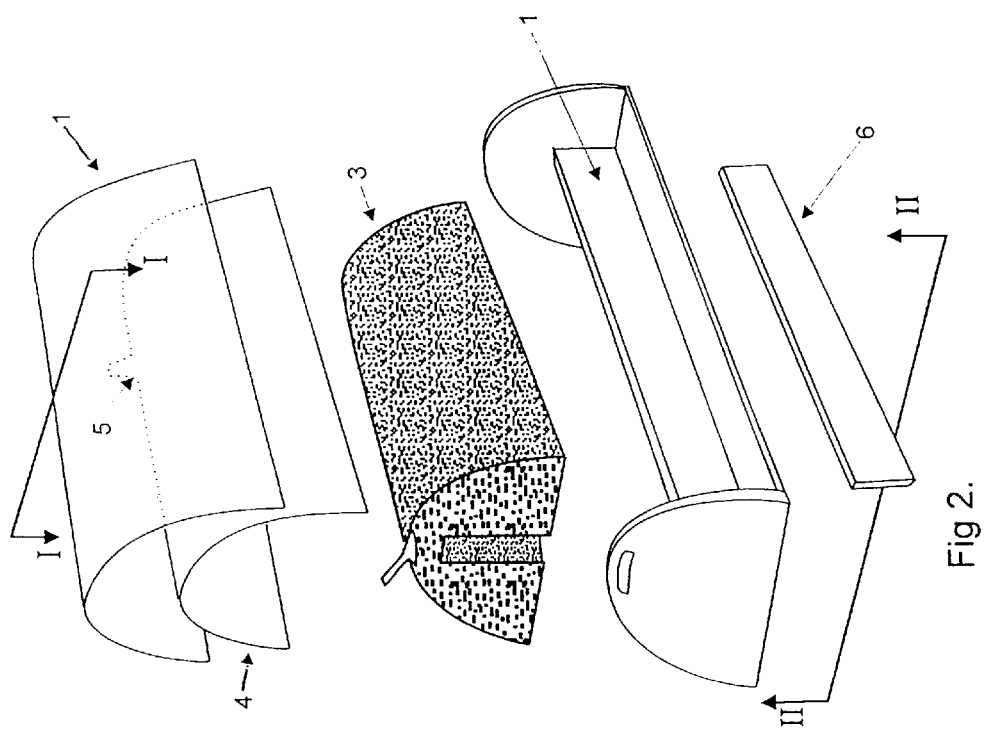
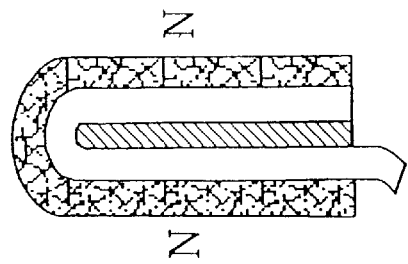

US 6,556,424 B2

SUPERCAPACITOR WITH MAGNETIZED PARTS

CROSS REFERENCE TO PROVISIONAL APPLICATION

Benefit is claimed of a provisional patent application filed Feb. 6, 2001, serial No. 60/266,450 now abandoned. The invention described there, as hereinafter, resides in subject matter summarized in the concluding paragraph on the third page of the provisional application, which is substantially repeated below in a section briefly summarizing the invention.

STATEMENT RE. FEDERALLY SPONSORED RESEARCH OR DEVELOPMENT

Not Applicable

MICROFICHE APPENDIX

Not Applicable

BACKGROUND OF THE INVENTION

1. Field of the Invention

In general, the electrical device to which the present invention relates belongs to the "liquid electrolytic capacitor" category. Technical jargon amongst chemical engineers recently, for example at the Third Hawaii Battery Conference, manifests their preference to refer to that category as 'electrochemical capacitors'. Subgrouping of electrochemical capacitors is based on mode of storing electrical charges, and includes 'electrical double-layer capacitors' (EDLC) and 'pseudo-capacitors' (PC). Electrode materials commonly utilized are high surface area carbons for EDLC, and transition metal oxides such as hydrous ruthenium oxide for PC.

To define what 'supercapacitor' means in the TITLE above and hereinafter, the term—sometimes encountered in print with a space between 'super' and 'capacitor'—refers to a composite type electric charges storing device combining features of the aforesaid two subgroups of electrochemical capacitors, EDLC and PC, that owes its capacitance partly to charge storage in electrical double layers formed at the phase boundary between electrode and electrolyte, and partly to a transient change of oxidation state in a pseudo-capacitance material like the ruthenium oxide already mentioned.

One factor motivating attempts to devise superior supercapacitors is the prospect of using them as power sources for self-propelled electric vehicles. Today's leading edge supercapacitors can store about one-fourth as much energy for a given volume and weight as a lead acid battery. If compared only in terms of weight and size needed to store a given amount of energy, therefore, lead acid batteries are considerably lighter weight and more compact than the best super-capacitors. However, the ability of supercapacitors to release substantially all their stored energy within a very short period, say five to ten seconds, is unmatchable by batteries. Thus are supercapacitors especially fitting to contemplate for onboard auxilliary power supply in electric vehicles, as an energy source procuring, on demand, the fast accelerating performance that most electric vehicles based solely on power from lead acid batteries lack. By suitably incorporating supercapacitors into the power system of electric vehicles that use lead acid or any other secondary batteries for basic cruising power, the results would be to improve acceleration for passing in traffic, and to achieve fast starts reaching say 96 kmh (60 mph) in under ten seconds.

Both secondary batteries, and supercapacitors in a complementary role to the batteries in an electric vehicle powering system, would be rechargeable by d.c. power input to them from any known system already devised to recharge the batteries. A petrol-fueled combustion engine driving a d.c. generator can be aboard the vehicle. Hybrid vehicle proposals combining fuel cells and secondary batteries are known to suggest recharging batteries with fuel cell generated power, in that case utilizing the batteries in a kick-in-when-needed type auxilliary role to fuel cell power for the basic cruising. There would be no obstacle to charging capacitors the same way. Another highly pertinent system in this context is the current-producing type of regenerative braking system that recovers energy of braking and converts it to d.c. current for storage. Usually that proposal is directed to recharging batteries, but again the recharged item could as well be a supercapacitor. The present invention is considered particularly applicable to supercapacitors used as an auxilliary source of power in an electric vehicle equipped for recharging of both batteries and capacitors during normal road travel operation, via either combustion engine-driven current generation, fuel cell power generation, or current-producing regenerative braking.

2. Description of Related Art

The leading edge in the art of devising superior supercapacitors has encountered very recently, a laboratory-verified difficulty with finding an effective balance between a highly desirable regularly interconnected pores structure for carbon electrodes procuring electrical double-layer capacitance, on the one hand, and the use of pseudocapacitance material to load the pores, to raise specific capacitance by adding pseudo-capacitance, on the other hand. To gain appreciation of this trade-off problem, one may first turn to a published comparison between a typical molecular-sieving carbon body and a new porous carbon body with a regularly interconnected network of somewhat larger pores than in the molecular-sieving carbon. If electrochemists of the past have sometimes tended to too blithely assume that larger surface area for electrodes is always better, the report next briefly reviewed may give pause for re-assessment of the suitability of porous materials containing myriad randomly distributed very small pores.

Seoul National University researchers S. Yoon et al, in their report, "Electrical Double-Layer Capacitor Performance of a New Mesoporous Carbon", Journal of the Electrochemical Society, 147 (7), pages 2507–2512 (2000), examine the differences between their new mesoporous carbon body and a typical molecular sieving carbon body, wherein the latter possesses the larger surface area of the two bodies because of smaller pores, and yet is outperformed in terms of charging/discharging rate capability at higher current densities by the new carbon body having smaller surface area because of larger pores, but featuring a regularly interconnected pores network. Even though the mesoporous body calculates as being of lower specific capacitance, in fact it stores more charge at high current density than does the molecular sieving carbon with higher calculated specific capacitance. S. Yoon et al explain the differences largely in terms of how phenomena are dominated by electrolytic resistance effects within pores. An ionic motions problem is involved. To further understand implications highly pertinent to the present invention, a follow-up report to the foregoing report is brought into the picture, bearing in mind that both types of carbon electrodes in the first report are electrical double-layer capacitors only, neither of them having a pseudo-capacitance aspect.

A report presented at the Third Hawaii Battery Conference by Seoul National University researchers J. Jang et al, entitled "Electrochemical Capacitor Performance of Ruthenium Oxide/Mesoporous Carbon Electrodes", is concerned with combining pseudo-capacitance procuring electrode material with electrical double-layer capacitance procuring electrode materials the latter being the same new mesoporous carbon as for the superior electrodes of the preceding report by S. Yoon et al, colleagues at Seoul with J. Jang et al. Ruthenium oxide loading of pores of the mesoporous carbon adds pseudo-capacitance related characteristics.

While success at raising the specific capacitance under relatively lower current densities was achieved by loading the carbon mesopores with ruthenium oxide, the researchers found evidence of pore-blocking that shifts the problem area back again to impaired ionic motions at higher current densities. Quoting J. Jang et al, bottom of page 8 and top of page 9: "In this work, we tried to enhance the specific capacitance of mesoporous carbon electrodes by loading ruthenium oxide that carries the pseudo capacitor characteristics. An enhanced specific capacitance is expected with these composite electrodes as two types of capacitors are combined. This beneficial effect may, however, be counterbalanced by a loss of rate capability because an excessive ruthenium oxide loading inside the mesopores may narrow down the pore size that eventually retards ionic motions." (emphasis added)

Drawing on the published revelations of the Korean research, the present inventor formulates the following desideratum: that in order to optimize high current performance of supercapacitors intended as compact energy reservoirs in electric vehicles, something is required to be done to obviate the recently evident trade-off between high specific capacitance and fast charging/discharging rates at high current, so that these desirable features are both optimized. With a few exceptions addressed further on, nothing remotely like what is to be done in accordance with the present invention existed in the art a year ago as a previous suggestion that may be routinely practiced. Two of the same inventor's patents require to be considered, before getting at the nature of the exceptions.

Robert N. O'Brien and Kalathur S. V. Santhanam in U.S. Pat. No. 5,051,157 issued Sep. 24 1991, for a "SPACER FOR AN ELECTROCHEMICAL APPARATUS" (assignee: University of Victoria) disclosed a method combining applied magnetic fields and specially shaped spacing structure placed between opposed electrodes, for optimizing stirring action in density-driven, naturally convecting, bulk liquid electrolyte circulating about the space between opposed electrodes where the new structure should be placed. The invention works whether the electrodes happen to be in a: (1) lead acid battery; (2) electromachining device; or, (3) chlorine gas producing saltwater electrolyzer. No capacitors are mentioned. This patent teaches more, however, than just the design of the specially slitted spacer having magnetized material embedding therein. Also disclosed are: that the apparatus casing should be "formed of silicon steel to provide a good magnetic environment", that the casing top be crossed by straps of the same material "to complete the magnetic circuit", that the casings be internally lined by "polyethylene to avoid corrosion", and that such a casing "may also be made into a permanent magnet, by incorporation of a magnetic material on, or by fusing of a magnetic sheet to the casing". (emphasis added)

The underlined suggestion above is among a limited number of exceptions to a general consideration by the present inventor that not very much published to date in the area of magnetically enhanced electrochemical cells technology is of material relevance to the present invention related to improving supercapacitor. It is considered that the bulk liquid stirring mechanism for reduction of internal cell resistance suggested in the O'Brien/Santhanam spacer patent would be expected by anyone following that main suggestion to only work in such apparatuses as (1)–(3) above, which typically have a significant quantity of low viscosity liquid electrolyte between electrodes that is known to manifest density-driven convection even during normal operation. In other words, the O'Brien/Santhanam patent holds out no promise of utility of its main suggestion unless it is directed to appropriately convective settings, so to speak.

Capacitors would, more likely than not, not come to the mind of an informed person absorbing information from U.S. Pat. No. 5,051,157.

Between issuance of the U. Vic. patent for the co-invented spacer, and filing the provisional application corresponding to this disclosure, the present inventor kept active in the growing field of magnetoelectrolysis. Others have cited his laser interferometric investigations as significantly contributing, as mentioned for example in the overview article entitled "Applications of Magnetoelectrolysis", by R. A. Tacken and L. J. J. Jansen, Journal of Applied Electrochemistry, 25, 1 (1995).

The technology of secondary batteries has burgeoned of late but applied magnetic fields have not generally been adopted as a panacea, and wherever a success for magnetic enhancement is won, it seems so far always to depend on non-routine tailoring of magnetic field generating means to fit highly differentiable battery designs. A few basic configurations were tackled in the inventor's U.S. Pat. No. 6,194,093 B1 entitled "MAGNETIZED CURRENT COLLECTORS COMBINED WITH MAGNETIC SHIELDING MEANS". Its Feb. 27, 2001 issuance date is three weeks after filing the provisional application corresponding to the present disclosure.

As usual, more was taught by publication of the patent than just the gist of the invention. Although most of the disclosure concerned novel folded-over sheet magnets encased by active electrode material and in turn themselves encasing inserts of magnetic shielding material, the patent also discloses much simpler structures that have neither encasements or inserts. The simpler structures were by text and figures taught to be useful at the extreme left or right ends of certain batteries, and can be single-sided magnetized electrodes mounted directly against a casing wall. Among the "functions not really concerned with magnetization of current collectors" it was mentioned without detail of description that there could be "means for replacement of removable negative electrodes". (emphasis added)

Picking out the above emphasized suggestion of something removable and replaceable, from U.S. Pat. No. 6,194,093 B1, is another instance of the relatively rare teachings in known prior art that the present inventor does consider to be of possible material relevance to at least limited aspects of the invention described below.

The recent current collectors patent also contains indications of a focus diverging away from the former focus of the spacer patent on the region of bulk liquid convection between electrodes. Now, in U.S. Pat. No. 6,194,093 B1, there is more attention directed to "regions between asperities and in pores of electrodes". (emphasis added)

Duty of candour obliges acknowledging the logical connectibility of doing something about ionic motions in pores of electrodes—as taught in U.S. Pat. No. 6,194,093 B1 first published on Feb. 27 2001—and what is presently proposed to do for satisfying the above set forth desideratum in the new context of supercapacitors. That the connection is logical enough to be possibly made does not mean the connection would probably be made by anyone.

Secondary batteries and related electrolysis devices, on the one hand, and capacitors, on the other hand, manifest significant differences between them that are not discountable customarily by technologists. The differences are considered by the present inventor to be substantial enough that technologists would not, by the time of original disclosure of the present invention, have adopted as a routine matter the transferring over to supercapacitors technology of magnetic enhancement methods specified for highly specific types of secondary batteries.

An important point of commonality between the different endeavors, viz., that in this inventor's recently patented magnetized current collector invention, on the one hand, and that of meeting the aforesaid desideratum concerning supercapacitors, on the other hand, is that engaging either set of issues always involves attending to the electrical double-layer formation at the phase boundary between electrode and electrolyte. Yet, even so, no secondary battery known to the inventor, that has yet been proposed for magnetic enhancement, has had the unique characteristic of supercapacitors, of combining electrical double-layer capacitance with pseudo-capacitance in the manner of the above reported Korean experiments. Had there been such a supercapacitor-like battery, obviously, its analogousness would make the presently proposed subjection of materials in a supercapacitor to influence of a magnetic field considerably less unheralded than the factual case here.

Three briefly indicated minor points of suggestion from certain references that were cited in the background of the magnetized current collectors patent will assist in concluding this background discussion.

First, J. Von Brimer in U.S. Pat. No. 3,597,278 (Aug. 3, 1971) taught that the magnets his drawing shows between lead-acid battery electrode plates "can be positoned outside of the plates, inside or outside of the cell". (emphasis added) This generously gave technologists lots of options, to supplement what guidance in so fresh an application was available to lead-acid battery makers in 1971. It remains true to this day, however, that magnets may be placed outside of a cell and yet affect events inside.

Second, Takahashi et al in U.S. Pat. No. 4,000,004 (Dec. 28, 1976) taught about their magnetized iron-electrode that "after its magnetism is weakened through repeated charging and discharging, the anode can again be magnetized easily without having to disassembling the battery construction". It would be helpful to know whether the magnetizing device (not shown) is to be carried to where the battery is when the part loses its magnetism, or whether the whole non-disassemblable battery is to be removed from whatever device it powers, then being carried away to some magnetizing installation.

Third, Kawakami et al in U.S. Pat. No. 5,728,482 (Mar. 17, 1998) taught a preference for using "a magnetic material exhibiting little degradation due to oxidation during the charging/discharging cycle of the battery". This policy is wise and should be adopted by everyone aware of possible chemically-induced demagnetization.

Clearly a variety of contributors to the endeavor of improving batteries by inclusion of magnetic field producing means have made a host of technical suggestions generally like the three above. The whole repertoire can be drawn on by creative minds for inspiration of inventing new supercapacitors improvements, but only after it is at first suggested somewhere that magnetically enhanced supercapacitors are desirable arid feasible.

BRIEF SUMMARY OF THE INVENTION

To summarize, this invention consists of magnetizing the metal backing parts of otherwise generally conventional supercapacitors, positioning at least one magnetized part per capacitor adjacent a porous electrode in the capacitor that is of composite construction using two materials, one for procuring electrical double-layer capacitance, and one for procuring pseudo-capacitance. The purpose of the magnetized part is to produce enhanced magnetohydrodynamic stirring both in a region of bulk liquid electrolyte adjacent entry positions to a network of interconnected pores of the composite electrode, and also inside the pores themselves, in order to remedy the reported deficiency of ionic motions that precludes an optimum balance of high specific capacitance and high rate capability for large current charging and discharging. The invention works by obtaining less internal resistance.

The magnetized metal backing parts require being located somewhat differently for differently shaped supercapacitors, ie., depending on the basic supercapacitor device geometry, because the magnetized part location must always be, as the invention claims, adjacent an electrode formed as a composite type utilizing both electrical double-layer procuring material and pseudo-capacitance procuring material in the usual manner of loading the latter material into pores in the former. For embodiments wherein the composite structure of combined electrode materials coats the interior surface of a non-magnetized casing, a preferred location for the adjacent magnetized backing part is against the casing, on the opposite surface thereof from the electrode forming materials, assuming the non-magnetic casing, when used, to be of relatively thin sheet material lacking any significant effectiveness as magnetic shielding. A portion of the casing itself, however, may be the magnetized backing part, if desired, in which version then separate magnetized parts are not needed for application against the casing exterior.

The below illustrated embodiments that are to be described in detail do not exhaust configurational possibilities for the invention.

The rate capability to be improved as already stated pertains to the heart of the 'counterbalancing' problem uncovered by the second cited report above, from Seoul National University researchers. Retaining the desirable feature of loading pores of a capacitor electrode with as much pseudocapacitance material as practicable to get high specific capacitance, while also obtaining shorter times of full charging/discharging, by deploying a magnetized metal backing part in the manner described is exclusively the suggestion of the present inventor, who believes that nobody else has perceived both the desirability and feasibility of doing what he proposes.

For needed guidance of the technologists, not to be left out of account are the two states of a supercapacitor when it is neither being charged or discharged; after full charging and before discharging; and after discharging and before recharging. Retention of the magnetic field of the proposedly magnetized metal backing parts is neither detrimental or essential for these particular two states of the device. Any notion that supercapacitor charging and discharging processes would be affected at all by stirring the normally stagnant electrolyte of an already fully charged or already fully discharged supercapacitor is outside the concept of the invention. Since no stirring is needed at those certain times, neither is presence of the magnetized parts.

Accordingly, for one embodiment of the invention there is provided integral means for removing magnetized metal backing parts at appropriate times. In certain instances to be described in detail below, the removal may entail partial electrode assembly removal, inasmuch as electrode assemblies of multi-element structure are possible, in which case a part only of electrode assembly structure, exemplified for two-sided electrode assemblies as core or insert, may be removed. For embodiments with this feature, the removable insert is the magnetized metal backing part.

The measures suggested for removability of parts will procure a number of significant advantages over and above and in aid of the main purpose. Diagnosis of extent of magnetization of the parts, checking them for possible need for re-magnetization on a scheduled basis is facilitated.

However, embodiments lacking the removal means need not be degraded from their usual capabilities and functions for a reasonable product lifetime, because such embodiments (without the removal means) may be built using higher quality permanent magnet materials for their magnetized parts. The parts in both non-removable and removable versions should be made of materials that are pre-graded for known extent of retention of magnetism under the conditions of the duty expected, specifically the magnitude of current handled by the modified supercapacitor. It is foreseeable that the cumulative effect of a large amount of use with sudden high current surges of electricity immediately adjacent the magnetized parts could tend to demagnetize them, more so if made of inferior grade material, by which is meant; a grade more liable to be demagnetized than better grades. The most careless selection, of course, would be to choose so inferior a grade of magnetic material that parts in the supercapacitor made of it would lose their magnetization at the first instance of discharge. At the other end of materials selection, it appears likely that magnetic materials producers will derive from publication of the present invention an impetus to develop materials specially tailored to retain magnetism at locations immediately adjacent structures passing large sudden surges of current. Probably, the best possible material for this service has not yet been prepared—which is not to say the invention cannot be carried out in an effective manner that leaves some room for improvement respecting materials It is because current-associated magnetic fields accompanying high current sudden discharges from capacitors are significant, and are in fact associated in other applications with design of means for switching off (demagnetizing) permanent magnets, for example in magnetic holding devices, that the technologists assigned manufacturing of magnetized metal backing parts for use in supercapacitors in accordance with this invention shall properly heed demagnetization properties of materials used.

Other objects, advantages, and novel features of the present invention will become apparent from the following detailed description when considered in conjunction with the figures of the accompanying drawing next briefly described.

BRIEF DESCRIPTION OF DRAWING FIGURES

FIG. 1 reproduces a prior art figure illustrating an electrode assembly, upside down from how it was published.

FIG. 2 is an exploded perspective view of an embodiment of the invention.

FIG. 3 is a half-sectioned assembled elevation view of the same embodiment as in FIG. 2, taken on the plane I—I/II—II of FIG. 2.

DETAILED DESCRIPTION OF THE INVENTION

Figure 4:
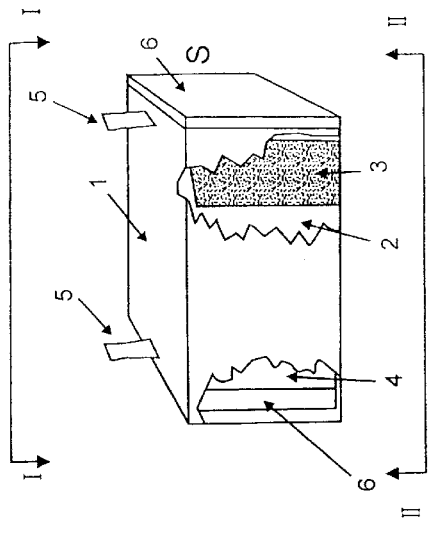
FIG. 4 is a partly exploded elevation view of another embodiment of the invention.

FIGS. 2–7 illustrate three embodiments of an improved supercapacitor of a construction generally designated 10, comprising a casing 1, an electrolyte 2, at least one porous composite electrode 3, at least one counter electrode 4, terminals 5 in connection respectively with composite electrode(s) 3 and counter electrode(s) 4, all these foregoing elements combining with magnetized metal backing part(s) 6 constituting a means for applying a magnetic field to composite electrode(s) 3 and electrolyte 2, whereby construction 10 in any of its variants is expected (by the inventor) to satisfy the desideratum formulated in the BACKGROUND section; meaning: the recently discovered trade-off between high specific capacitance and high current fast charging/discharging rates will be obviated by the invention.

Why the figures of drawing include FIG. 1 reproducing a prior art figure illustrating an electrode assembly, upside down from how it was published, requires to be explained. Insofar as the inventor is aware, his own disclosure of advanced magnetically enhanced batteries in U.S. Pat. No. 6,194,093 B1 represents the closest conceptually related electrochemical teachings on the scene. Anyone might easily mistakenly judge that one or more specific structures proposed for the construction 10 as a whole, of embodiments of this invention, derive from that near-art prior invention. FIG. 1 is present both to facilitate distinguishing key differences of structure that otherwise might be missed due to misplaced focus on merely superficial resemblances, and to alert technologists that passing current through the magnetized metal backing part(s) 6 shown in all other figures is not always required.

With reference now to FIGS. 2 and 3 which illustrate the same embodiment from different views, terminals 5 are preferably connected, as shown, not to magnetized part 6, but rather to electrodes 3 and 4. Porous composite electrode 3 is best fabricated in the manner practiced by Seoul National University researchers J. Jang et al, who synthesized a mesoporous carbon with a large pore volume with the pores being uniform in size about 12 nm across, using a silica sol template method wherein, similarly as described in references 4, and 5, identified in the abovecited Yoon et al report, phenol prepared in the pores of mesoporous aluminosilicate templates was carbonized and then the inorganic template was removed with a hydro-fluoric acid treatment. Into the pores of the mesoporous carbon, ruthenium precursors were loaded by a chemical vapor impregnation method, then the result was heat-treated to obtain the ruthenium oxide/mesoporous carbon composite. Technologists to engage in practicing the present invention are advised to apply what is known from the Seoul National University research respecting fabricating porous composite electrodes 3, because this type electrode is of proven utility in leading-edge supercapacitors. The particular function it excels at is simultaneous provision of electrical double-layer capacitance and pseudo-capacitance. Here it warrants noting that secondary battery electrodes have not been known to similarly provide. For example, the conveniently shown FIG. 1 electrode assembly, when the patent it is from is consulted, does not have supercapacitor capabilities.

Continuing with reference to FIGS. 2 and 3, counter electrode 4 is preferably a curved sheet of platinum, which due to the expense of platinum may be thin. How thin could be easily arrived at by routine experiment, as could substantially functionally equivalent substitute materials not so costly be found. More importantly, regarding the function of counter electrode 4, irrespective of which suitable highly conductive, corrosion and heat resistant material it is made of, it is used only to add or subtract electrons on its surface to complete the capacitor. This function is quite different from that of secondary battery electrodes, both positive and negative of which must provide sites for reversible redox reactions that involve deposition of substances. In fact, the preponderance of published research work in the field of magnetoelectrolysis has been concerned with how applied magnetic fields affect substance depositions, eg., in magnetically enhanced methods of electroplating, a process analogous to what occurs during recharging of secondary batteries. Yet here, in the differentiable context of supercapacitors, such substance deposition related concerns do not arise, as shown by use of counter electrode 4 only to add or subtract electrons on its surface.

Still with reference to FIGS. 2 and 3—although nearly everything said respecting corresponding components holds true as well for embodiments illustrated by FIGS. 4 and 5, and 6 and 7—the electrolyte 2 should be basically consistent with what Jang et al report using, viz., 2.0M aqueous sulfuric acid solution. However, they were not applying magnetic fields, and from experiences of the present inventor as one of few electrochemists who have tailored solutions specifically for use as electrolytes in magnetically enhanced electrochemical cells of all types, an increase to 6.0M is preferred. Again, there are routine experiments with varying solution strength and/or finding equivalent electrolytes that technologists can do. Addition of an indifferent paramagnetic substance to the electrolyte is another topic, dealt with further below after needed discussion of figures.

Next regarding the shape of casing 1 as shown in FIG. 3 when exploded portions shown in FIG. 2 are joined, there is need to discuss how the two inverted U-shaped portions and the underlying floor portion join.

The two inverted U-shaped portions and the underlying floor portion—all designated 1 in FIG. 2—join together in such a manner that the inward facing surface of the smaller of the two inverted U-shaped portions defines, actually, an exterior part of casing 1 per se that forms a pocket into which the magnetized metal backing part 6 fits. It is of course vital that where the separately illustrated portions (FIG. 2) join as shown in FIG. 3, the joints are liquid-tight, so that electrolyte 2 does not leak out. Notice that magnetized part 6 is not contacted by electrolyte 2 and is located, from both directions left and right in FIG. 3, with first the casing 1, and then the porous composite electrode 3, between magnetized part 6 and electrolyte 2. To the inventor's way of looking at it, it is true here to say, as in the SUMMARY section above, that the "location for the adjacent magnetized backing part is against the casing, on the opposite surface thereof from the electrode forming materials", here in the instance where, also quoting from the SUMMARY, "the composite structure of combined electrode materials coats the interior surface of a non-magnetized casing". FIGS. 2 and 3 illustrate a casing 1 which can be made of a tough plastic, or ceramic material, or in general any strong material except ferromagnetic, which is not needed. More than just not needed, there must be no magnetic shielding material, eg., highly permeable magnetic alloy, between composite electrode 3 and magnetized metal backing part 6. Furthermore, magnetic field effects fall off rapidly with distance, so the casing should be thin. How thin depends on both structural integrity shape-holding necessity and on how strongly magnetized part 6 is. Considering where the inner inverted U-shaped portion of casing 1 might be of magnetized material, that portion then becomes in effect the equivalent of a magnetized part 6, which can be dispensed with, optionally, in that event of magnetizing the casing 1 portion as just indicated.

Although the most fundamental terms of the invention can, if desired, be met by an embodiment with a casing 1 magnetized in part, at the appropriate location at the inward facing side of the inverted U-shaped composite electrode 3, which is to say: location opposite its side facing electrolyte 2, if this unillustrated option were exercised, the resulting type of magnetized metal backing part could not be removed, for to do so would break away part of the casing and allow electrolyte to spill out.

It will be apparent then, that the peculiar shape of the embodiment of the invention illustrated by FIGS. 2 and 3 has nothing to do with mimicry of the electrode assembly of FIG. 1 from the prior invention, and everything to do with providing a pocket into which a magnetized metal backing part 6 which is removable will fit. Of course the option applicable to all known removable components of not removing them is left open. If desired, part 6 could be cemented into place making it no longer removable, but it is difficult if not impossible to conceive what advantage there would be to such affixation. Devices for removing part 6 from the embodiment illustrated by FIGS. 2 and 3 are not shown, but a dotted outline in FIG. 3 accompanied by a directional arrow is intended to convey the idea of possible removal. It is easy to think of specific means for removal; for example, a tab protruding from its base could be pulled on to remove magnetized metal backing part 6 from the pocket in casing 1. As discussed in the SUMMARY section above, a magnetized component is not needed in a fully charged supercapacitor that is just biding its time, so to speak, before the next occasion of its discharge. Presence of magnetized part 6 is only significant during charging and discharging. Interesting to note is an applications-suggestive fact that a set of several identical embodiments of the invention as illustrated by FIG. 3 could be serviced by the same single magnetized part 6, moved from one to another as needed, assuming they would be charged in sequence, and discharged in sequence, rather than all at once.

Magnetized metal backing part 6 is preferably a faces-poled sheet or plate of ferromagnetic material with opposite poles, N and S, at opposite faces. Unlike the electrode assembly of FIG. 1 from related art, there is no bending over here to make one face face outwards and the other inwards. The reasons for the bending a sheet magnet over in the related art do riot pertain here, in a supercapacitor different from a secondary battery. A preferred metal for part 6 is one that provides strong structural properties in combination with a high degree of magnetic coercivity, for example: chromium steel, Lungsten steel, cobalt steel, or vanadium steel, magnetized in a magnetic field of about 20000 oersted, preferably. More exotic high coercivity materials like samarium cobalt and niodymium-iron-boron are also candidates for magnetic plate making.

Figure 5:
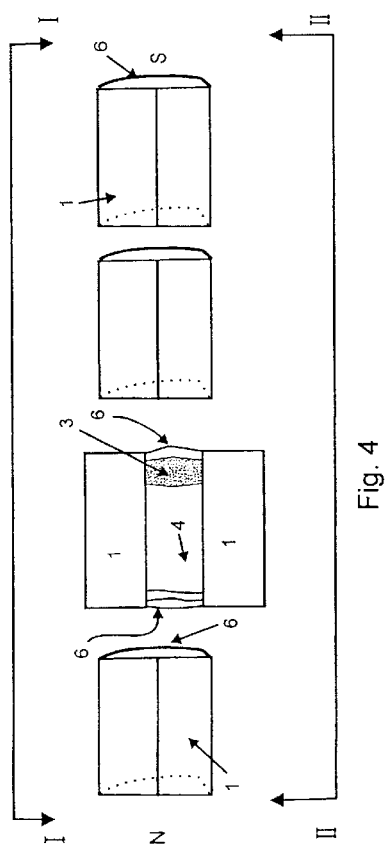
FIG. 5 is a half-sectioned assembled elevation view of the same embodiment as in FIG. 4, taken on the plane I—I/II—II of FIG. 4.

Like FIG. 2, FIG. 4 uses explosion of components to convey how a variant embodiment of the same invention may be constructed. Casings 1 in this instance must be electrically nonconductive and may be ceramic. The half-casings of course must be joined suitably to be liquid-tight. Magnetized metal backing parts 6, preferably constructed of similar material as for the embodiment of FIGS. 2 and 3, here are slightly dished and form ends to the casings 1. In FIG. 5 it is shown that, starting with the most leftward plate 6, all rightward facing faces of every other magnetized plate 6 mount counter electrodes 4. Starting with the most rightward plate 6, all leftward facing faces of every other magnetized plate 6 mount porous composite electrodes 3. The thickness of electrolyte 2 in bulk freely circulatable quantity between generally vertical electrode nominal surfaces is at least 0.3 mm as stated in the provisional application corresponding to the present disclosure. A greater quantity of electrolyte, however, may be present within pores of electrodes 3, depending on their thickness. The faces of plates 6 that do not mount counter electrodes 4 on rightward facing faces, and the faces of plates 6 that do not mount composite electrodes 3 on leftward facing faces, afford themselves as terminals 5 for an electrical series arrangement which mimics use of so-called bi-polar electrodes known in the chemical processing industry. This illustration of an embodiment of the invention, in FIG. 5, discloses the magnetically enhanced supercapacitor preferred for front page publication.

Figure 6:
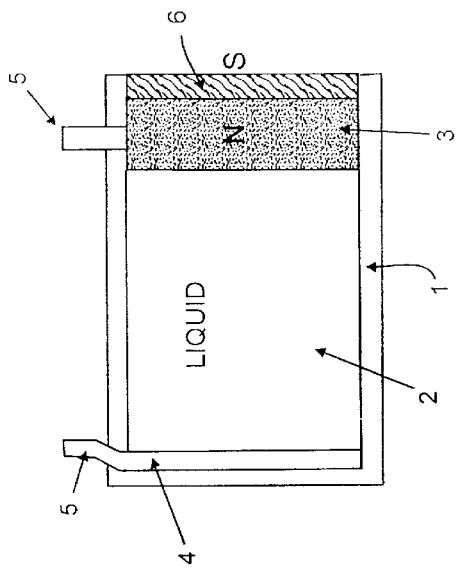
FIG. 6 is a partly cutaway perspective view of a simpler embodiment of the invention than the embodiments of FIGS. 2 and 3, 4 and 5.
Figure 7:
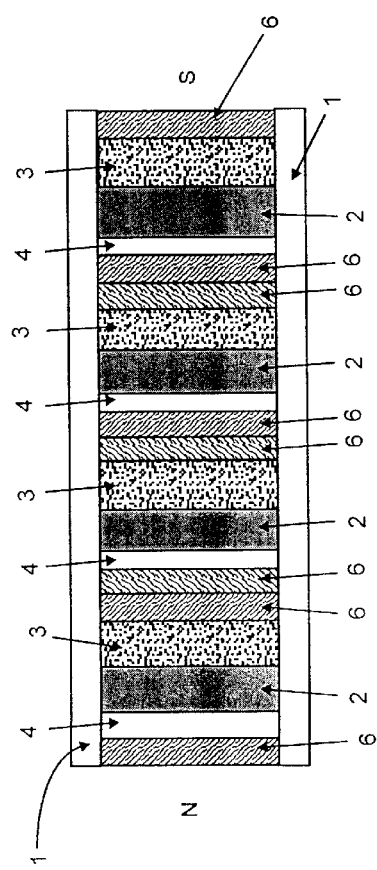
FIG. 7 is a half-sectional elevation view of the same embodiment as in FIG. 6, taken on the plane I—I/II—II of FIG. 6.

FIGS. 6 and 7 illustrate a simple embodiment in a single unit. It approximates the layout of any one of the series-laid units of FIGS. 4 and 5, but with terminals 5 as conventional top-mounted items. All the figures use the same numeral designations of components. The embodiment in FIGS. 2 and 3 does not carry current through magnetized parts 6, but the embodiment in FIGS. 4 and 5 does. The simple embodiment in FIGS. 6 and 7 could be varied with ease to go either way, just by repositioning terminals 5.

To next furnish rationale for the proposed addition of indifferent paramagnetic ions to the electrolyte (not illustrated in the figures), it is unavoidable to mix in some speculative theoretical considerations together with safely established facts concerning ionic motions, influence of a magnetic field on the same, and so forth.

First, notwithstanding differences between electrochemical processes in secondary batteries and electrolysis devices, on the one hand, and in supercapacitors, on the other hand, it is a clear fact that ionic motions are involved for the latter as well as the former. During discharge of the supercapacitor, the electrical double layer at the phase boundary of electrode and electrolyte is broken up. Ions in the solution are then no longer arrayed as with the double-layer intact and this entails their motion. Furthermore, the pseudocapacitance aspect is well known to involve a Faradaic process, specifically in the case of changing oxidation state of the typical pseudocapacitance material, eg. ruthenium oxide, entailing displacement of oxygen entities—not exactly a depositioning process like in electroplating, but positioning, anyway, and this means motion too.

Second, natural convection of bulk liquid electrolyte in supercapacitors, in the region outside a pores network is not known to be significant, nor known to be insignificant, or at least the present inventor is unaware of research emphasizing it, which seems understandable in view of rapidity of processes in supercapacitors. Here is the speculative point. In research with electrolyses of various metal solutions, certain electrode configurations did not respond to magnetic field effect significantly, and some solutions were less affected as well, irrespective of configurations. The more paramagnetic the more affected, turned out to be the case. So it became an experimental expedient of adding paramagnetic substances to speed up slow or start up virtually non-existent convective motion, rendered visualizable by interferometric techniques for which the inventor is known. The expedient proved viable as a supplementary means of electrolytic process enhancement. Accordingly here too, just because it is a sure bet that if paramagnetic ions are present in an initially stagnant supercapacitor fluid, some motion that otherwise would not occur will certainly occur, when both a current is passed through the fluid and the fluid is subjected to an applied magnetic field.

Candour compels stating there is no quantitative data at present, to compare 'with' and 'without' paramagnetic substance addition specifically in context of supercapacitor electrolyte motions.

Addition of paramagnetic substances to electrolyte 2 should not be done unless U.S. Pat. No. 6,194,093 B1: "care is taken to avoid establishing any corrosive shuttle mechanisms which could occur if the selected paramagnetic ions were not truly inert in the battery process." (emphasis added) Transpose 'supercapacitor process' for the prior emphasized term. It was acknowledged earlier, the reader will recall, that there are a few, not many, exceptions to a general consideration of non-transferability of teachings direct and unmodified from battery art to supercapacitor art. Candidate paramagnetic substances are well known from published reports on the subject, so they need not be gone into here.

The proposal to combine with conventional supercapacitor parts a magnetized part is brought forward by the present inventor as a step that advances from what already is at the leading edge of supercapacitor art. Whether there is plausibility to this suggestion may require taking into consideration all facts of record including all related art mentioned heretofore, and all references cited in the background of all art mentioned. A final fact of record in the art, generally, of magnetoelectrolysis will be offered in place of the present inventor expounding his own views. In the Canadian Journal of Chemical Engineering, Vol. 50, 1972, S. Mohanta and T. Z. Fahidy stated, in "The Effect of a Uniform Magnetic Field on Mass Transfer in Electrolysis", last sentence of the first paragraph: "While the exact nature of the magnetic field/ electric field interaction in electrolysis is not well understood, the existence of a measurable interaction, although of a magnitude considerably less than in liquid metals, is now beyond doubt." The concluding sentence of the article states: "The effect might be utilized to increase cell performance in electrolytic technologies where mechanical stirring of the electrolyte is impractical from the point of view of rational cell design."

There having been ample opportunity for others to identify technologies to benefit, yet apparently nobody having previously come forward to identify supercapacitor technology as such a one, the present inventor now does so, coupled with practical guidance and prophetic examples of apparatus that will not prove difficult to make and use, given the current level of skill in relevant circles.

From the foregoing description, one skilled in the art can easily in the essential characteristics of this invention, and without ng from the spirit and scope thereof, can make various changes and modifications of the invention to adapt it to various usages and conditions. Consequently, such changes and modifications are properly, equitably, and intended to be within the full range of equivalence of the following claims.

What is claimed as new is:

1. A supercapacitor that combines:
   a casing capable of liquid-tight confinement of a liquid electrolyte;
   a liquid electrolyte confined by said casing;
   a porous composite electrode permeated by said liquid electrolyte and which is composed of a first electrode-making material and a second electrode-making material in mutual adhesion, provided that said first and second electrode-making materials are so selected that, during a period of charging said supercapacitor,
       said first electrode-making material functions to procure a greater extent of electrical double-layer capacitance than said second electrode-making material is capable of procuring, and
       said second electrode-making material procures a greater extent of pseudo-capacitance than said first electrode-making material is capable of procuring;
   a counter electrode that is capable of use to add or subtract electrons on said counter electrode without providing sites for reversible redox reactions that involve deposition of substances, and that is separated from said porous composite electrode by a region occupied by said liquid electrolyte;
   means for applying a magnetic field to said porous composite electrode and to said liquid electrolyte; and,
   terminals respectively in connection with said counter electrode and said porous composite electrode.

2. A supercapacitor as in claim 1, in which said means for applying a magnetic field comprises a magnetized metal backing part located adjacent a side of said porous composite electrode facing away from said region that is occupied by said liquid electrolyte that separates said counter electrode from said porous composite electrode.

3. A supercapacitor as in claim 1, in which said means for applying a magnetic field comprises a magnetized metal backing part that is integrally part of said casing.

4. A supercapacitor as in claim 1, in which said means for applying a magnetic field comprises a magnetized metal backing part that is detachably affixed to said casing.

5. A supercapacitor as in any one of claims 1–4, in which a predetermined quantity of an indifferent paramagnetic substance capable of enhancing magnetohydrodynamic stirring of said liquid electrolyte is present in said liquid electrolyte.

6. A supercapacitor as in any one claims 1–4, in which said terminals respectively in connection with said porous composite electrode and said counterelectrode do not conduct current into said means for applying a magnetic field to said porous composite electrode and said liquid electrolyte.

* * * * *